United States Patent
Gu et al.

(10) Patent No.: US 9,471,776 B2
(45) Date of Patent: Oct. 18, 2016

(54) SECURED EXECUTION OF A WEB APPLICATION

(75) Inventors: Yuan Xiang Gu, Ottawa (CA); Garney David Adams, Ottawa (CA)

(73) Assignee: Irdeto B.V., Hoofddorp (NL)

( * ) Notice: Subject to any disclaimer, the term of this patent is extended or adjusted under 35 U.S.C. 154(b) by 0 days.

(21) Appl. No.: 14/389,752

(22) PCT Filed: Mar. 30, 2012

(86) PCT No.: PCT/CA2012/000297
§ 371 (c)(1),
(2), (4) Date: Jan. 9, 2015

(87) PCT Pub. No.: WO2013/142947
PCT Pub. Date: Oct. 3, 2013

(65) Prior Publication Data
US 2015/0161384 A1    Jun. 11, 2015

(51) Int. Cl.
*G06F 21/54* (2013.01)
*G06F 21/12* (2013.01)

(52) U.S. Cl.
CPC ............. *G06F 21/54* (2013.01); *G06F 21/125* (2013.01); *G06F 21/128* (2013.01); *G06F 2221/033* (2013.01)

(58) Field of Classification Search
CPC ............. G06F 21/52–21/54; G06F 2221/033; G06F 21/10; G06F 21/12–21/128
See application file for complete search history.

(56) References Cited

U.S. PATENT DOCUMENTS

| | | |
|---|---|---|
| 2002/0052965 A1 | 5/2002 | Dowling |
| 2005/0021992 A1* | 1/2005 | Aida .............. G06F 21/10 726/26 |
| 2005/0044197 A1* | 2/2005 | Lai .............. G06Q 10/10 709/223 |
| 2006/0282897 A1 | 12/2006 | Sima et al. |
| 2009/0193497 A1 | 7/2009 | Kikuchi et al. |
| 2011/0138351 A1* | 6/2011 | Monsifrot .............. G06F 21/14 717/100 |

FOREIGN PATENT DOCUMENTS

| | | |
|---|---|---|
| WO | 2010054235 A2 | 5/2010 |
| WO | 2011057393 A1 | 5/2011 |
| WO | WO 2011/057393 A1 * | 5/2011 .............. G06F 21/22 |

OTHER PUBLICATIONS

International Search Report and Written Opinion cited in corresponding International Application No. PCT/CA2012/000297 dated Dec. 14, 2012.

(Continued)

*Primary Examiner* — Linglan Edwards
*Assistant Examiner* — Kevin Bechtel
(74) *Attorney, Agent, or Firm* — Marc S. Kaufman; Amardeep S. Grewal; Reed Smith LLP

(57) ABSTRACT

Methods and nodes for securing execution of a web application by determining that a call dependency from a first to a second function needs to be protected, adding a Partial Execution Stub (PES) function comprising code to establish a communication connection with a trusted module. Methods and nodes for secured execution of a web application by invoking a function of the web application, invoking a Partial Execution Stub (PES) function during execution of the function of the web application, sending, from the PES function, a message call with current execution information to a trusted module and receiving, a verification result from the trusted module.

27 Claims, 14 Drawing Sheets

(56) References Cited

OTHER PUBLICATIONS

Yang et at, "CORBA: A Platform for Distributed Object Computing", Operating Systems Review, vol. 30, No. 2, pp. 4-31, 1996.
Extended European Search Report cited in corresponding European Application No. 12873189.0 dated Apr. 13, 2016.
Rajan S P et al., "WEAVE: Web Applications Validation Environment", Software Engineering—Companion Volume, 2009, ICSE-Companion 2009, 31st International Conference, IEEE, May 16, 2009.
Partial Supplementary European Search Report cited in corresponding European Application No. 12873189.0 dated Nov. 4, 2015.

* cited by examiner

SECURED EXECUTION OF A WEB APPLICATION

RELATED APPLICATION DATA

This application is the National Stage of International Patent Application No. PCT/CA2012/000297, filed Mar. 30, 2012, the disclosure of which is hereby incorporated by reference in its entirety.

TECHNICAL FIELD

The present invention relates to secured execution of a web application.

BACKGROUND

Wireless interconnectivity and devices are dominant technologies being deployed and used in everyday life, whether for business use or personal use. In addition, cloud computing is changing information cultures and is part of an emerging business strategy for a new delivery model for Internet-based computation services, application software, data access, and storage. Security associated with untrusted environments becomes challenging. Traditional computer and network security schemes are inadequate to address vulnerabilities and attacks associated to these untrusted systems.

A web application is an application that is accessed over a network such as the Internet or an intranet by using web browsers, and is coded in a browser-supported language (such as JavaScript, combined with a browser-rendered markup language like HTML). The web application relies on a common web browser to render the application executable. The ability to update and maintain web applications without distributing and installing software on potentially thousands of client computers is a key reason for their popularity, as is the inherent support for cross-platform compatibility. Compared to early HTML and JavaScript to the latest HTML5, latest web applications are becoming platform and browsers independent. Browsers are also providing application execution environments. When compared to native execution environments, secured execution of a web application provides new challenges. Pressure is greater than before on mobile device manufacturers (whether smart phones or tablets) and network operators to maintain costs at the lowest possible level. Yet, execution of the same web application should provide the same functionality, no matter what device it is executed on. For lower end devices, resources are usually more limited, which creates additional pressure on the web applications.

For example, KJava on Symbian platform is a scaled down Java Virtual Machine (JVM) designed for mobile platforms. KJava contains a subset of the Java 2 Standard Edition (J2SE) packages and implements restricted Mobile Information Device Profile (MIDP) and restricted Connected Limited Device Configuration (CLDC) profiles. For instance, restrictions include 1) no support for Java Native Interface (JNI); 2) limited reflection capabilities (e.g., limited ability to examine or modify runtime behavior); 3) no custom class loaders (e.g., no ability to fine tune behavior of the class loader).

Exemplary limitations related to execution resources or environment restrictions have been mentioned and are of particular relevance in the context securing web application execution, which is generally addressed in the present application.

SUMMARY

The present invention aims generally at providing protection techniques to secure execution of web applications within non-native execution environments. In general, a client device should support running applications on-line (internet connected) or off-line (not internet connected). Securing the execution of such applications should be persistent, no matter whether it runs on-line or off-line. The present invention provides a general framework that allows for secured execution of an application on-line or off-line, although the protection techniques can leverage specific aspects of on-line or off-line execution.

A first aspect of the present invention is directed to a method for securing execution of a web application comprising. The method comprises, on a processor of a client device, invoking a function of the web application. The method follows with, on the processor of the client device, invoking a Partial Execution Stub (PES) function during execution of the function of the web application. The method then continues, from the PES function, with sending a message call with current execution information related to the web application. The message call is sent to a trusted module. A verification result is thereafter received by the PES function from the trusted module related to the message call.

Optionally, the method may also comprise establishing, by the PES function, a communication connection with the trusted module. In this option, the message call is sent via the socket connection and the verification result is received via the communication connection. The communication connection may be a local or remote socket connection or a websocket connection that can be used for both local and remote connections. The trusted module may be executed on a server node or locally in the client device.

In one option, a second message call is sent to a second trusted module from the PES function with further current execution information related to the web application. For instance, the second trusted module may provide at least one function not offered by the trusted module. The PES function may thereafter receive a second verification result from the second trusted module related to the second message call.

In another option, the PES function may forward the message call with current execution information related to the web application to a second trusted module in response to the verification result. For instance, the second trusted module may provide at least one function offered by the trusted module and the verification result may indicate that the required processing was not performed by the first trusted module or indicate that a timeout from the trusted module was received as the verification result. The PES function may thereafter receive a second verification result from the second trusted module related to the forwarded message call.

Optionally, the verification result may indicate tampering of the web application, in which case the method may further comprise, from the PES function, invoking a mitigation action. The mitigation action can vary and may involve, e.g., returning incorrect next function information, returning an invalid function definition, or returning a standard error function or result, causing the application behavior to fail immediately, fail gradually or execute incorrectly.

The verification result may alternatively comprise a next function information to be invoked for the web application. In this latter case, the method may follow with invoking the next function. The method may also follow with returning a function to the web application for injection into the web application and subsequent invocation.

A second aspect of the presented invention is directed to a method executed in a network node for converting a web application to a secured web application. The secured web application may be obtained by applying static and/or dynamic processing techniques. The determination of what combination of processing techniques depends on implementation choice being the web application. In this second aspect, the processor is exemplified as securing the web application in a static manner. For instance, the processing is applied to the web application prior to deploying the web application.

The method comprises reading, at the network node, code of the web application from a memory unit. The code comprises more than one function. Thereafter, the method continues with determining from a function call graph of the web application, that at least a call dependency from a first function to a second function of the more than one function needs to be protected. The web application is thus modified into the secured web application code by adding to the code of the web application, a at least one Partial Execution Stub (PES) function comprising code to establish a communication connection with a trusted module. The PES function requires interaction with the trusted module. The web application is further modified into the secured web application code by modifying code of the web application by replacing invocation of the second function from the first function with invocation of the PES function from the first function and generating a set of rules from the function call dependency graph to define the call dependency from the PES function to the second function. Thereafter, the method follows with, at the network node, storing the secured web application into the memory unit and the set of rules into the memory unit. Once the secured web application is obtained, it may be delivered to one or more client device.

Optionally, a plurality of PES functions may be present and each one of those may be related to a call dependency.

Optionally, generating the set of rules is performed by generating a symbolic Partial Execution Flow Map (PEFM) and storing the set of rules into the memory unit is performed by storing the symbolic PEFM into the memory unit. Generating the set of rules may further comprise taking security requirements related to security actions and mitigating actions into consideration.

As another option, the first function and the second function may be present in the code of the web application as a single function. The method may thus further comprise splitting the single function into the first and second functions based on an asset being processed in the single function.

The set of rules (or the symbolic PEFM) may comprise a record comprising a current caller element identifying the first function as a current calling function requiring an inquiry before invoking the second function, a current PES element identifying the PES function as invoking the trusted module to trigger the inquiry, a next function element identifying the second function and providing information necessary for invocation of the second function, an element of trusted functions identifying a set of functions that are linked with the trusted module and can be executed by an invoking mechanism within the trusted module and a security actions element identifying a set of security features that the trusted module is capable of executing prior to returning a result of the inquiry.

The method may also optionally comprise signing the secured web application prior to storing and encrypting set of rules prior to storing.

A third aspect of the present invention is directed to a trusted module for securing execution of a web application executing on a client device. The trusted module comprises a connection module, a function call module and a verification module.

The connection module is for receiving a communication connection request from a Partial Execution Stub (PES) function of the web application. The function call module is for receiving a message call from the PES function via the communication connection. The message call comprises current execution information related to the web application. The verification module is for determining, based on the current execution information, a next function to be executed for the web application and sending a result of the determination to the PES function via the communication connection.

The trusted module may be executed on a server node remote from the client device executing the web application or on the client device. The trusted module may further comprise a security module comprising secured functions and pre-defined mitigating actions.

Optionally, the result of the determination may indicate tampering of the web application. Alternatively, the result of the determination may comprise a next function information to be invoked for the web application.

The connection module may optionally further establish a connection with a second trusted module in order to obtain the verification result. The second trusted module may provide at least one function offered by the trusted module and/or at least one function not offered by the trusted module.

A fourth aspect of the present invention is directed to a client device comprising a network interface module and a processor executing a web application. The network interface module opens a communication connection between a Partial Execution Stub (PES) function and a trusted module. The processor executes the web application by invoking a function of a web application, invoking the PES function during execution of the function of the web application, sending a message call from the PES function with current execution information related to the web application to the trusted module via the communication connection and receiving a verification result from the trusted module related to the message call.

Optionally, the trusted module may be executed on a remote server node.

The verification result may indicate tampering of the web application, in which case the processor may further execute a mitigation action. Alternatively, the verification result may also comprise a next function information to be invoked for the web application, in which case the processor further invokes the next function.

A fifth aspect of the present invention is directed to a network node for converting a web application to a secured web application. The network node comprises a memory unit and a processor for securing the web application.

The memory unit is for storing code of the web application, which comprises more than one function.

The processor is for securing the web application by determining, from a function call graph of the web application comprising at least a call dependency from a first function to a second function of the more than one function, that the call dependency from the first function to the second function needs to be protected, and modifying the web application into the secured web application code. Modifying the web application into the secured web application code is performed by adding to the code of the web application, a partial execution stub (PES) function comprising code to establish a communication connection with a trusted module. The PES function requires interaction with the trusted module. Modifying the web application into the secured web application code is further performed by modifying code of the web application by replacing invocation of the second function from the first function with invocation of the PES function from the first function and generating a set of rules from the function call dependency graph to define a call dependency from the PES function to the second function. The processor is further securing the web application by storing the secured web application and the set of rules into the memory unit. In the fifth aspect, the processor is exemplified as securing the web application in a dynamic manner. For instance, the processing is applied prior to sending the web application to the client device, but after the web application is installed on a network node.

Optionally, generating the set of rules may further comprise taking security requirements related to security actions and mitigating actions into consideration.

Optionally, generating the set of rules is performed by generating a symbolic Partial Execution Flow Map (PEFM) and storing the set of rules into the memory unit is performed by storing the symbolic PEFM into the memory unit.

As another option, the first function and the second function are present in the code of the web application as a single function. The processor is further splitting the single function into the first and second functions based on an asset being processed in the single function.

The processor may further sign the secured web application prior to storing and encrypt the set of rules prior to storing.

DETAILED DESCRIPTION

Figure 1:
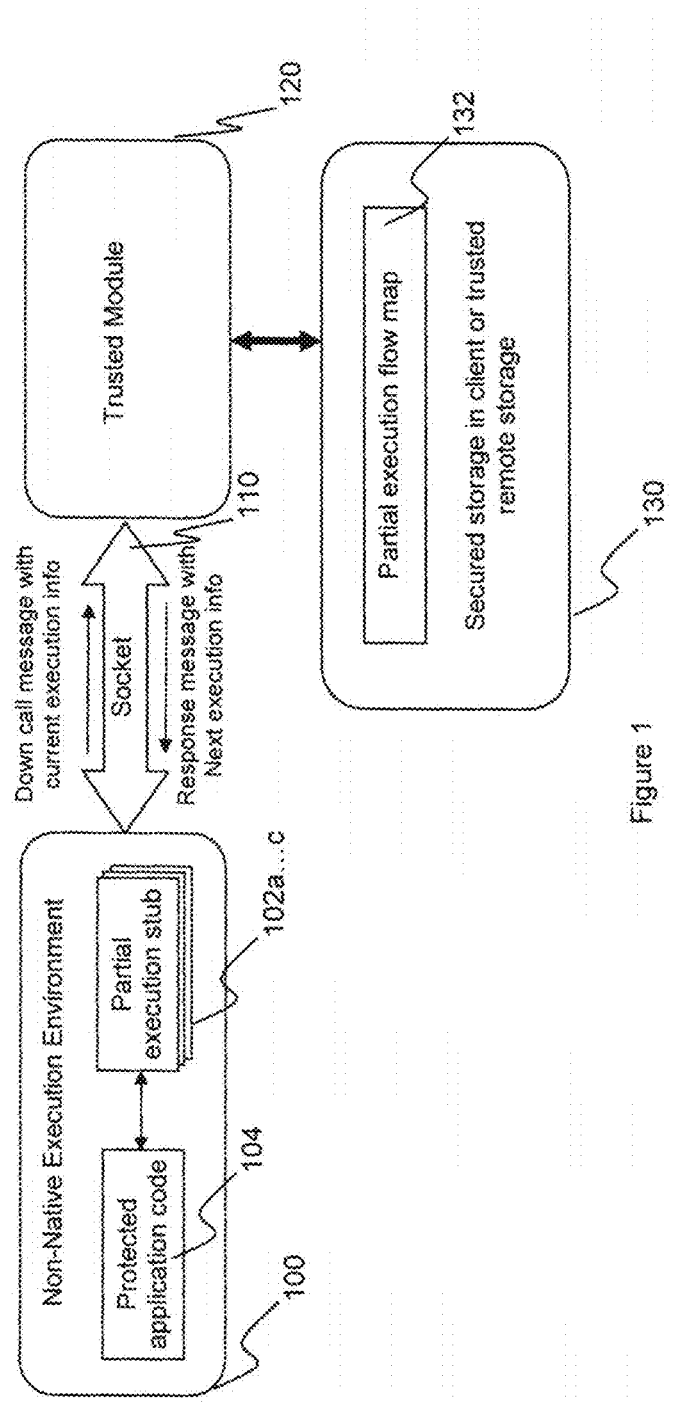
FIG. 1 shows an exemplary modular representation of different components involved in secured execution of a web application in accordance with the present invention.

Computer programs are generally expressed in some abstract language. The language can be translated using a series of compilation and linking steps to a binary code that can be executed (or interpreted) by a computer (or other processing devices). The programs can also be compiled into a virtual machine instruction set that can be executed on a virtual machine interpreter. Some programming languages do not require the compilation and linking steps, but are interpreted by a language specific interpreter.

Protecting interpreted code is a difficult problem as the source code of the application is available at the client and the application has no direct access to the machine hardware.

A known attack technique is to analyze the control or logical flow of an application. In order to prevent an attacker to analyze the logical flow of the application, it is possible to remove the control flow from the program and replace it with a runtime access to an address server that provides the application with the information required to continue execution. Such possibility is currently only available for native execution environments and not to non-native languages and environments.

It is possible to perform some functions at a remote computer with special resources, which cannot be easily and/or efficiently be transferred to a client. The details of the remote functions cannot easily be observed by an attacker. Some examples of this technology are Remote Procedure Calls (RPC), Common Object Request Broker Architecture (CORBA) and Simple Object Access Protocol (SOAP).

Trust modules are used in various applications and take the form of smart cards, dongles and cryptographic modules. These are commonly used to perform some attack sensitive functions. Moving these functions to a more attack-resistant environment increases the security of the application executing in a more open execution environment. Digital Rights Management (DRM) clients implement similar trust module functions using software. It is possible to have a software application implementing a standard decoder for compressed video streams where some data structures in the standard decoder need to be adapted by software executing in a more tamper-resistant environment.

There are security problems in securing execution of non-native applications. For instance, non-native execution environments, such as web browsers, JVM and other scripting environments, are much less secured than native execution environments. Exemplary causes include:

1. In interpreted languages, attackers can access a high level language description of the application, and modify underlying code and execution logics including control flow and decision information.

2. Non-native applications are shielded from the details of the underlying hardware or operating system. The non-native applications do not directly access security resources provided by the computing platform and do not use strong protection enabled by and built up on the native computing platforms.

3. An application engine, a virtual machine (run-time environment), or scripting engine is not typically designed and implemented with necessary requirements for white-box security and self-protection. Although they may introduce certain security, they typically only address certain man-in-the-middle vulnerabilities. A fundamental security weakness is typically a good place to start for an attacker that wishes to hack an application.

4. Many well developed or commercialized software security and protection techniques designed to protect native code cannot be directly adapted to non-native execution environments.

Another example of security problems related to securing execution of non-native applications is that the execution of a non-native application typically involves different pieces of software. The different pieces of software are usually provided in different forms and perform interactions at different execution stages. For instance, it is typically easier to do snip and spoof attacks to non-native execution logics compared to native executables. It is likely more difficult to maintain the integrity of the execution of a non-native application.

Yet another example of security problems related to securing execution of non-native applications is that many security features and protection mechanisms need to be triggered or involved from the protected execution of a non-native application. If the security features are not tightly integrated and interwoven with the original functional execution logic of the non-native application, they can easily be skipped or removed from the protected execution leading to the overall security from such protections being compromised. Hence, securing execution against any attack in the protected execution shall result into failure of the protected non-native application to execute, thereby preventing attacker to achieve the goals and access protected assets.

It is possible to use a trusted module to extend its security services to a non-native application. The trusted module should be a well protected component and provide a set of protections. The trusted module may provide for a trusted zone as a root of trustiness extending to a non-native application by an execution-enabling mechanism between the non-native application code and the trusted module.

The present invention aims at securing applications by moving control flow decisions and sensitive functions from the actual application to a trusted module generating an adapted application and protected data that needs to be processed by a trusted module. In general, this objective is achieved by interlacing application code (non-native side) and trusted module (can be native side, or non-native or in other forms including implemented in hardware) by using partial execution dependencies, which are processed and generated statically or dynamically by a tool. After this processing, the new adapted application code only contains incomplete execution logics. The remaining execution logics and certain sensitive functions are represented in partial execution dependencies that can be managed and accessed only by the trusted module, and not directly from the protected non-native application code.

For instance, during execution, an adapted (e.g., secured) application connects to the trusted module and transmits its current point of execution and some context information. The trusted module processes the context data based on the current point of execution and the protected data, which may include code for the trusted module. With this mechanism, the real execution of the protected application may be constructed dynamically by using partial execution dependencies by interacting with the trusted module. As a result the adapted application obtains modified context information and a new control point where the adapted application continues its execution.

There is no static view of execution logics presented fully by the protected application code. At any state of the execution, only current partial execution becomes visible within the non-native execution environment.

An original execution flow is protected by execution within the trusted module. The trusted module can be connected by using an execution-enabling mechanism (e.g., an Application Programming Interface (API)) between the protected application and the trusted module (e.g., JNI between Java and native code) or communication channels such as sockets or remote connections to connect the protected application and the trusted module. In the example of HTML5 environment, Websocket can provide a connection to serve both local and remote communications between an application and trusted modules. It is possible to use a WebSocket API to connect a HTML5 web application with a local or/and remote trusted module or connect a local trusted module with a remote trusted module. Such a communication capability can empower, simplify and standardize some implementation of this invention. Secured application that would be subjected to an attack (e.g., to hacking), such as trying to skip execution through the trusted module may thus cause wrong behavior or incomplete execution of the original application. This technique is thus able to improve trustworthiness of distributed application execution compared to current mechanism.

Connection methods to bridge execution between the protected application and the trusted module may require design and implementation of partial execution dependencies. If there is an execution extension interface between non-native and native, such as JNI, partial execution dependencies can be represented directly in code form or through more advanced protections. If there is no such execution interface, such as kJava environment or HTML5 Websockets in a web browser environment, partial execution dependencies need to be represented as symbolic forms that can be passed by communication channels. In HTML5, protections can be further enhanced by providing function decryption during execution such that the function is unencrypted and dynamically loaded into the web browser page.

The present invention extends the function of an external trust module with root of trustiness and secured capabilities. The trusted module calculates a next execution point for the execution/interpretation and processes context information that allows the trusted application to implement some security sensitive operations and return modified context information.

As the attacker can no longer easily observe the functional processing in both the adapted application and trusted module, the application is more difficult to reverse engineer.

From a programming perspective, a function (routine) is one of most basic and important functional constructs of software. In general, a call dependency of an application code contains one of most important execution logics that layout structural relationship between different functions that are functional components. Executable code, by nature, self-contains such a dependency. Therefore, it is relatively easy to alter the execution by modifying call dependency to tamper original execution. From security requirements, certain functions are critical because they involve valuable digital assets, such as crypto keys, IP algorithms, bank account numbers, login passwords, proprietary business logics, etc., that require necessary protection. From attacking purpose, those functions become main targets for attacks. Securing the execution is to protect those functions and call dependencies between those functions to guarantee the integrity of the original execution of the application.

Reference is now made to the drawings, in which FIG. 1 shows an exemplary overview of securing execution via dynamic partial execution. FIG. 1 shows a non-native execution environment 100, a trusted module 110, a communication (e.g., socket) connection 120 between the non-native execution environment 100 and the trusted module 110 and a secured storage 130. Upon analysis of the call graph of a non-application code, it is possible to replace some call dependencies of specific functions (e.g., that can be identified and specified by a user) into symbolic Partial Execution Flow Map (PEFM). The original calls are then replace with partial execution stubs (PES) 102a . . . 102c that can bridge invoking relationship between protected function codes 104 via the trusted module 110. During run-time of the protected application 104, when executing a protected function F1 that intends to invoke next function F2 that is also protected, F1 actually invokes a particular PES 102a such that it holds the current execution and sends a message call with current execution information through the communication connection 110 to the trusted module 120 to inquire a next method to be executed. The trusted module 120 will use the current execution information to search the next function to be executed from a secured PEFM 132. If the search is successful, the trusted module 120 can perform some security features, for example integrity verification and anti-debug before returning the next function information to be invoked as the result back to the PES 102a via the communication connection 11o. If the search failed, it indicates that the current call dependency is tampered and an attack is detected. A designated mitigation action may thus be taken by the trusted module. After the PES 102a receives the next function information, the PES 102a passes necessary parameters and invokes the particular function accordingly in order to continue the execution of this protected application 104.

The following list includes exemplary advantages which may be provided by different embodiments of the present invention:

A protected application code contains, statically, only partial execution information. Without knowing dynamically-removed partial execution flow information within the trusted module 120, the entire application cannot execute completely and correctly.

This secured execution interlacing extends application execution with the trusted module 129 (or other third party security modules) during the execution. It provides an opportunity for various additional protection features to be deployed by the trusted module 120.

Figure 2:
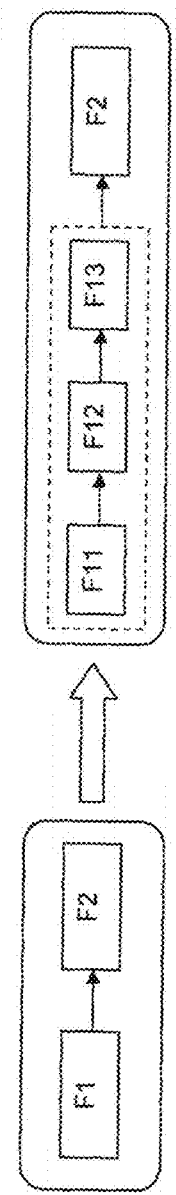
FIG. 2 shows an exemplary function splitting in accordance with the present invention.

FIG. 2 shows an exemplary function splitting in accordance with the present invention. An original execution can be enhanced by necessary function splitting, e.g., for security purpose. A function can be split into two or more than two smaller functions by introducing new invoking relationship. For example, there are two functions, F1 and F2. We can split F1 into three smaller functions F11, F12 and F13. This is a technique that can be applied in source code level, intermediate code level or binary code level. On source code level, it can be done manually with some security code guideline.

For security requirements, if a function contains a number of assets that are processed within some important code segments, it is likely to be more secure to split the function into smaller functions in order to leverage interlacing capability using dynamic partial execution interlacing. Examples of assets that are likely to require protection include crypto keys, IP algorithms, bank account numbers, login passwords and proprietary business logics.

A record of the PEFM 132 is formatted with four elements:

1. Current caller: specify the name of current calling function that requires an inquiry for next function to invoke.

2. Current PES stub: specify the name of the current PES stub to invoke the trusted module to trigger the inquiry.

3. Next function: specify necessary information of next function to be invoked by current caller. For different non-execution environment, the information can be different. For example, in a JVM, the information of next function may contain class name and method name whereas in HTML5, it may contain a page or document object model of the web page and the javaScript function name.

4. Trusted functions: specify a set of functions that have been linked with the trusted module and can be executed by invoking mechanism within the trusted module. Normally, these functions are some special functions offered by the trusted module or some original functions have been implemented in a way that can be loaded into the trusted module. Trusted functions can be deployed with the trusted module at installation time, and/or dynamically linked with the trusted module at runtime. The nature of types of trusted functions and how they are deployed can be dependent on the trusted module implementation. Exemplary trusted functions include cryptographic operations and integrity verification functions. In addition, while processing a web application, it may be possible to analyze a web page content and extract sensitive functions for trusted function invocation. These trusted functions can be delivered to the trusted module in encrypted form, and loaded, decrypted and executed by the trusted module.

5. Security actions: specify a set of security features that the trusted module can do prior to returning search result. It is optional and up to user's requests during build-time. Also, it can be driven by security policy.

Figure 3:
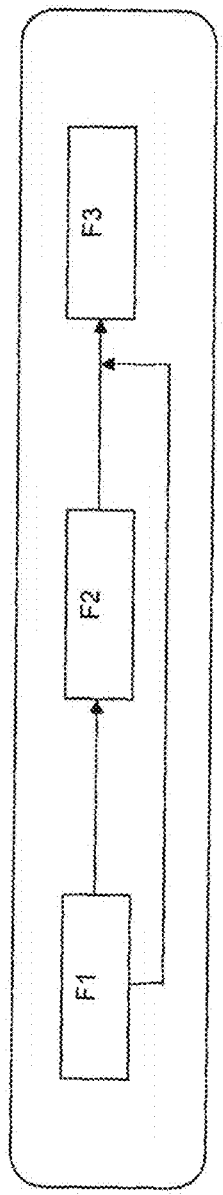
FIG. 3 shows an exemplary original function dependency in accordance with the present invention.
Figure 4:
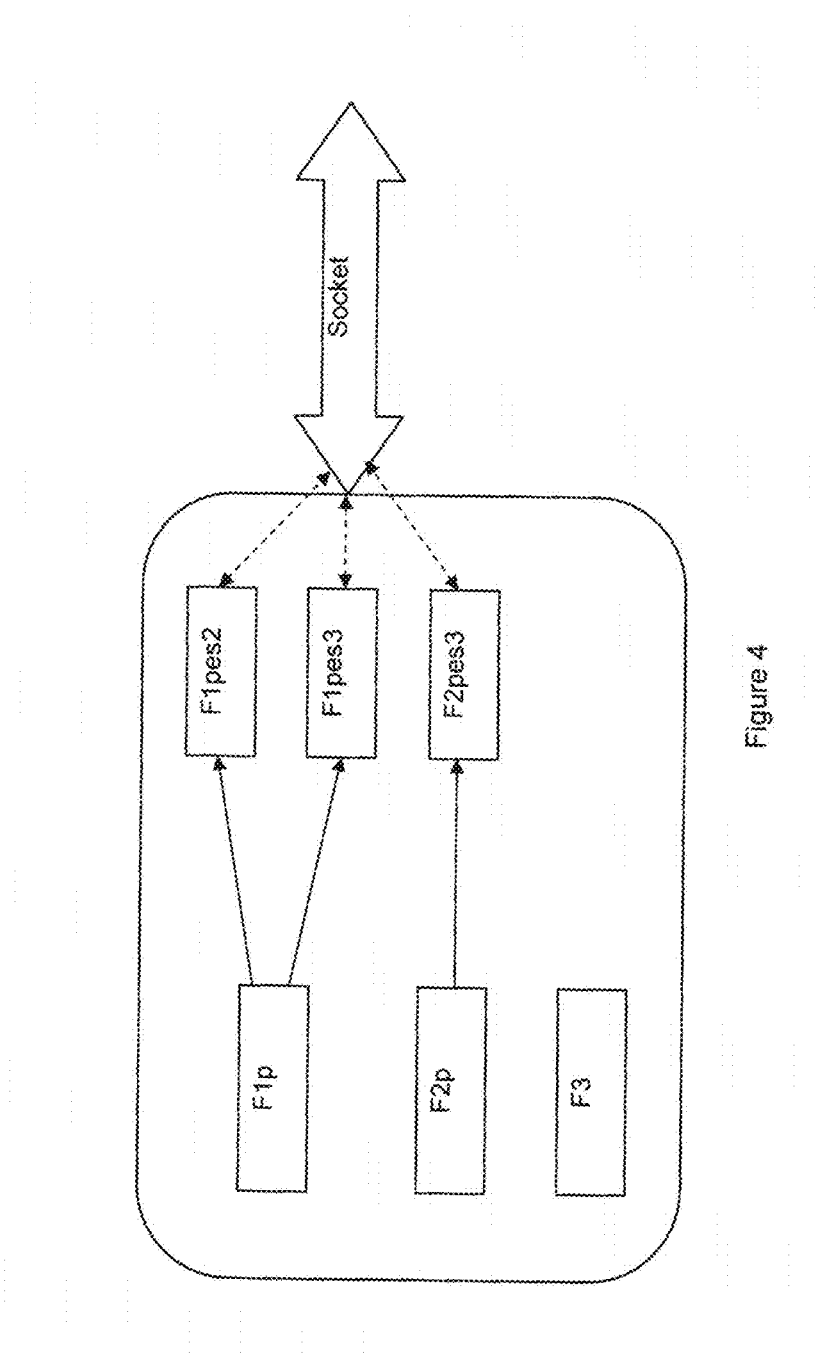
FIG. 4 shows an exemplary protected application code with incomplete partial execution in accordance with the present invention.

Reference is now made concurrently to FIGS. 3 and 4, which respectively show an exemplary original function dependency and an exemplary protected application code with incomplete partial. The example of FIGS. 3 and 4 is useful in illustrating partial execution flow in more details.

A processing tool can take the following steps to generate the protected application code only with partial execution and a symbolic PEFM:

Step 1: If necessary, do function splitting based on some security requirements. This step is not required in the present example.

Step 2: Analyze the call graph and identify the important functions and their call dependencies for protection by requests from a user as input options and configuration to the tool. In the present example, we would like to protect F1 and F2 and call dependencies of F1 calling F2, F1 calling F3 and F2 calling F3.

Step 3: For each of functions to be protected and for each calling dependency that requires to be protected a. A PES function is created. The PES function can accept real parameters from caller function and pass them to the callee function that will be dynamically determined. Also, the PES function needs to facilitate the communication with a communication (e.g., socket) connection with the trusted module. For example, for F1 calling F2, we create F1pes2 stub function.

b. The original invoking is replaced by invoking the PES stub function.

For example, F1 calling F2 is replaced by invoking F1pes2 stub function.

c. A record of PEFM is created with filling necessary information. For example, on F1 calling F2, the record of PEFM can be set as follows:
  i. Current caller: F1p
  ii. Current PES stub: F1pes2
  iii. Trusted functions: ignore for this example.
  iv. Next function: F2p
  v. Security actions: Integrity verification if we select this option.

Step 4: Process trusted functions.

Step 5: Generate a protected application code that only contain incomplete execution dependencies.

Step 6: Generate a symbolic PEFM and then encrypt it by using white-box cryptographic methods.

Step 7: Perform the signing to protected code of the non-native application and generate integrity verification (IV) voucher.

Step 8: Encrypt PEDM and IV voucher using white-box cryptographic methods and pack them into a easy-deploy package After this exemplary processing, a protected application code with protected partial execution dependencies (as illustrated in FIG. 4) and a record of the PEFM (as illustrated in the following table 1) are generated.

TABLE 1 an example of PEFM

| Current Caller | Current PES Stub | Trusted functions | Next Function | Security Actions |
| --- | --- | --- | --- | --- |
| F1p | F1pes2 | IV and AD | F2P | Integrity verification |
| F1p | F1pes3 | IV and AD | F3 | Anti-debug |
| F2p | F2pes3 | IV and AD | F3 | Integrity verification |

The entire call relationship of an application does not need to be symbolized. Instead, only certain call dependencies between most needed functions and require security features that can be enforced by the trusted module should be symbolized.

Depending on the business model, there are typical four deployment models:

1. Deploy both of the protected application code, trusted module and partial execution package into a client environment. The protected application code should look like normal application. It still can be applied by other protection techniques like normal applications. For example, you can still apply secure loader protection. The partial execution package must be stored into local secured storage where the trusted module is able to access.

2. Deploy the protected application code and trusted module into a client environment and partial execution package into a remote trusted storage. The key difference between this model and above model is that partial execution package needs to be deployed into a remote storage server that can be accessed by the trusted module via remote access facility.

3. Deploy the protected application code into a client environment, and a trusted module partial and execution package into a remote trusted storage. The key difference between this model and other models is that the trusted module and partial execution package can be deployed remotely and partial execution package can be stored in a remote storage server that can be accessed by protected application via remote access facility.

4. Combine 3 models above together to deploy the protected application code into a client environment with the following possible characteristics:

a. In the client environment, there are one or more trusted modules and some partial execution package is stored in local secured storage.

b. In remote servers or cloud environments, there are one or more trusted modules and some partial execution package is stored in remote trusted storage.

c. Dynamical execution dependency will be coordinated by correlations between different trusted modules locally and remotely.

d. Protection can be on-line or off-line or switch between locally or remotely, making attacks difficult.

The present invention is not meant to be limited to any of the foregoing scenarios, but can be very flexible and applied to achieve strong protection and flexible renewability.

After a protected application and its partial execution package are deployed, the protection can take its effects when the protected application is running on a device. The example of FIGS. 3 and 4 is reused to discuss securing the execution by using the dynamic partial execution with reference to FIGS. 5(a), (b), (c) and (d).

When executing a protected function (F1p) from a non-native execution environment 500, a particular PES function (F1pes2) is first invoked with a set of real parameters, which parameters are the ones the original F1 would use to invoke original F2. The F1pes2 function accepts inputs and then sends a down call message with current execution information, in which F1p is identified as the current caller and F1pes2 is identified as the current PES. The down call message is sent to a trusted module 520 through a communication (e.g., socket) connection 510 to inquire a next method to be executed.

The trusted module 520 will use this current execution information to search the next function to be executed from the secured PEFM located in a secured storage 530. A search component, PE Handler, within the trusted module 520 can decrypt and access the PEFM securely by using white-box crypto and search whether the current execution information can match a record of PEFM. If the search fails, it indicates that the current call dependency is tampered and an attack is detected such that the current execution will be on-hold and entry mitigating stage. Otherwise, the search is successful and it indicates that the current execution can be continuing. Considering the matching, the trusted module 520 gets research results of next function and security actions. Next, the security agent of the trusted module 520 can perform those security actions, for example integrity verification and anti-debug. If those security features are successful, the trusted module 520 will send a response message to the F1pes2 via the communication connection 510 with the next function information to be invoked as the result back. Otherwise, other attacks will be detected by the trusted module 520, through using those security features and the current execution, should enter the mitigating stage.

After the F1pes2 receives the next function information from the trusted module 520, the F1pes2 invokes the F2p and pass necessary parameters received while F1p called accordingly in order to continue the execution of this protected application.

Thereafter, the current execution extends to a protected function (F2p). When F2pes3 is invoked, it acts similarly to the F1pes2 with a set of real parameters, which are parameters that original F2 would use to invoke original F3. The F2pes3 function accepts these parameters and then sends message to the trusted module 520 with current execution information, in which F2p is identified as the current caller and F2pes3 is identified as the current PES, to the trusted module 520 through the communication connection 510 to inquire a next method to be executed. Similarly, the trusted module 520 uses the new current execution information to search the next function for F2p to be executed from the secured PEFM. The process above is not repeated, for sake of conciseness.

Suppose the trusted module 520 returns F3 as the next function to the F2pes3, it then passes the received parameters to the F3 and invoke the F3.

Figure 5:
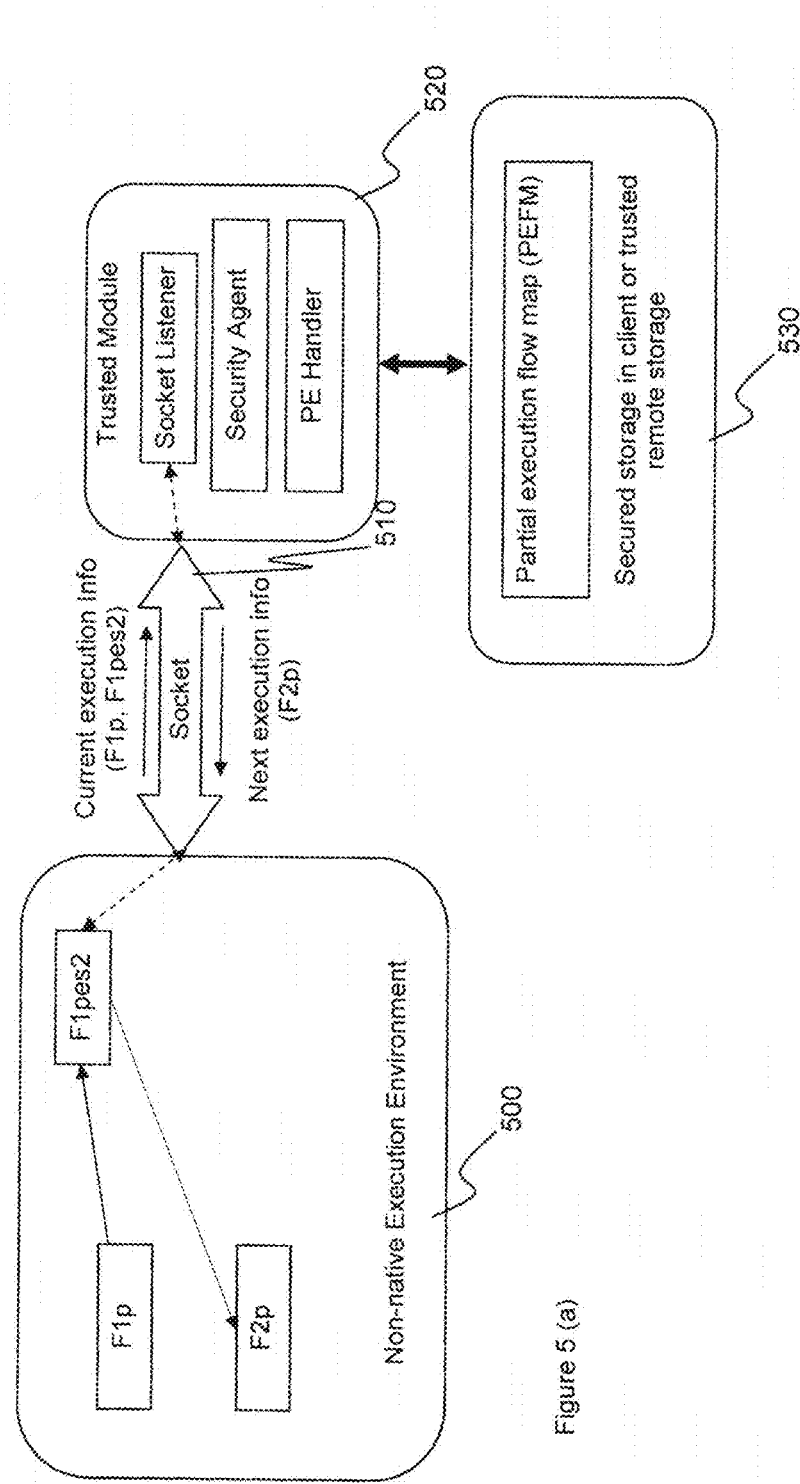
FIG. 5(a) shows an exemplary modular representation and functional diagram of an invocation of F1p to F2p via F1pes2 in accordance with the present invention.
FIG. 5(b) shows an exemplary modular representation and functional diagram of an invocation of F1p to F2p to F3 via F2pes3 in accordance with the present invention.
FIG. 5(c) shows an exemplary modular representation and functional diagram of an invocation return back from F3 to F1p in accordance with the present invention.
FIG. 5(d) shows an exemplary modular representation and functional diagram of an invocation of F1p to F3 via F1pes3 in accordance with the present invention.
Figure 5:
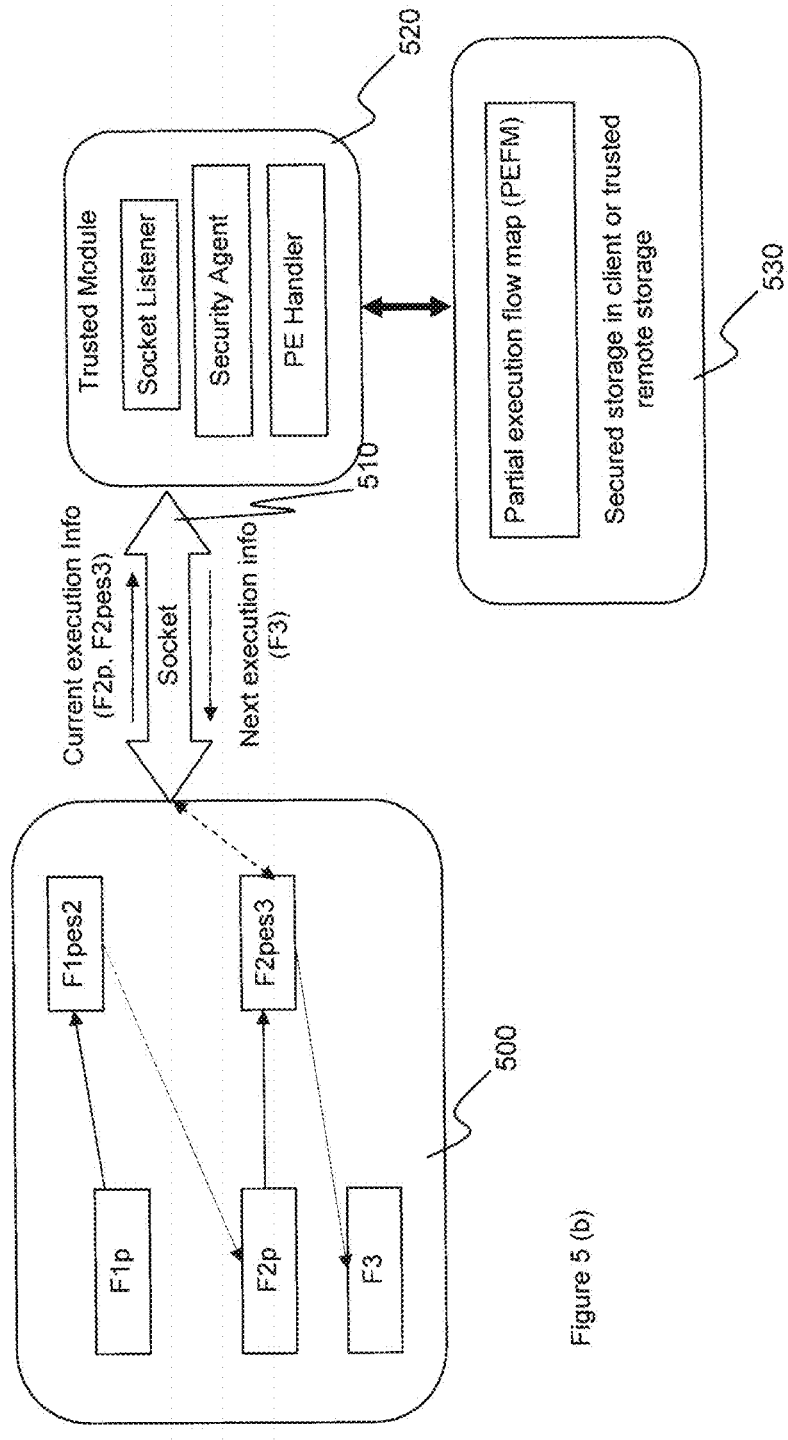
Figure 5C:
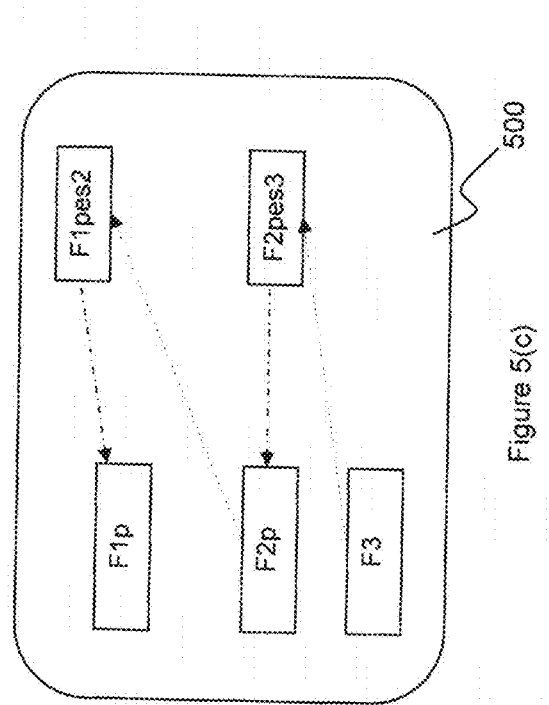
Figure 5:
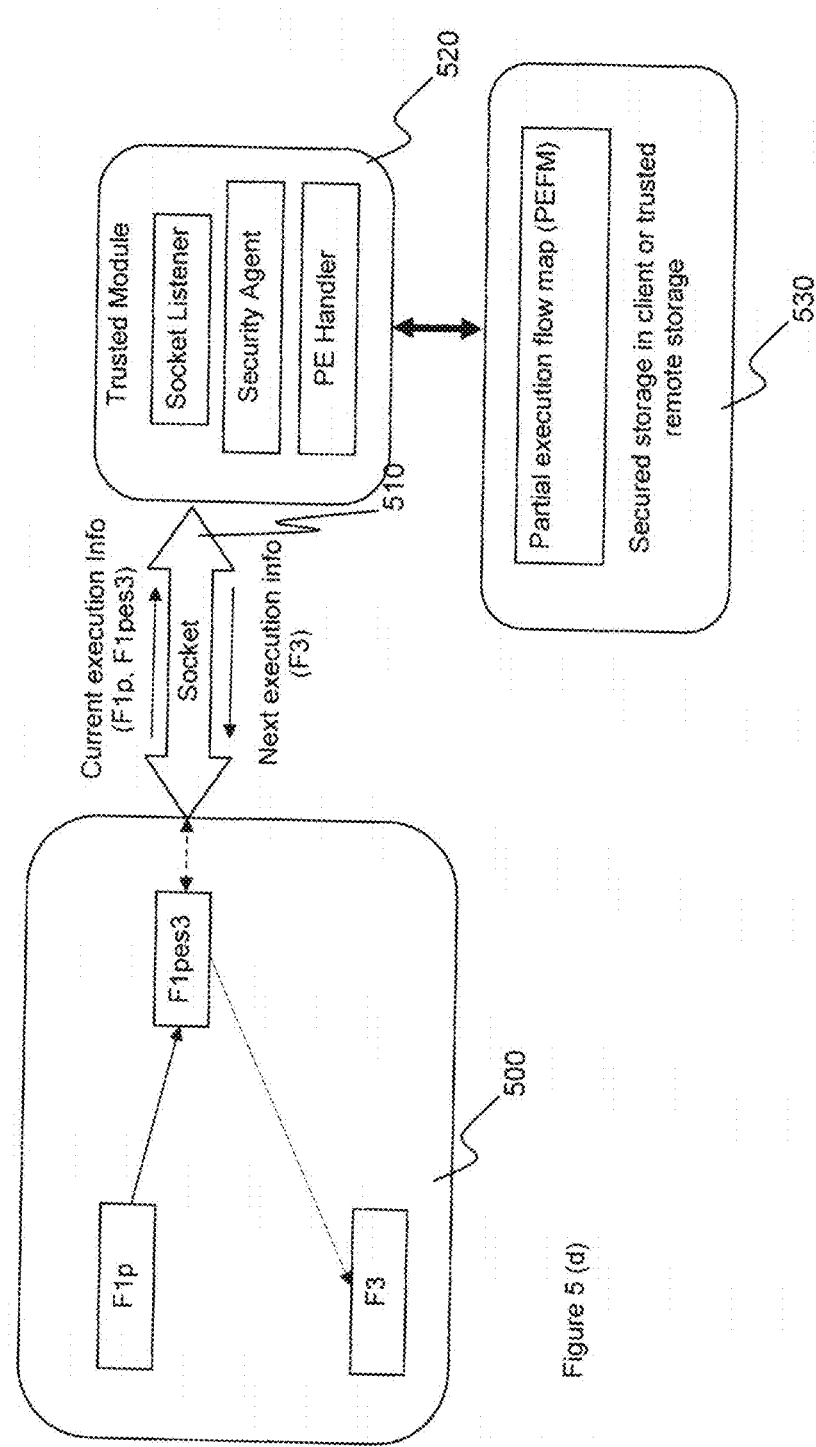

After execution of F3 is completed, the current execution returns back to the F2pes3 and then return back to the F2p, and then return back to the F1pes2 and finally return back to F1p, which is particularly illustrated on FIG. 5(*c*).

Afterwards, the example continues with, the F1p invoking F3 via F1pes3, as particularly illustrated in FIG. 5 (*d*).

Figure 6:
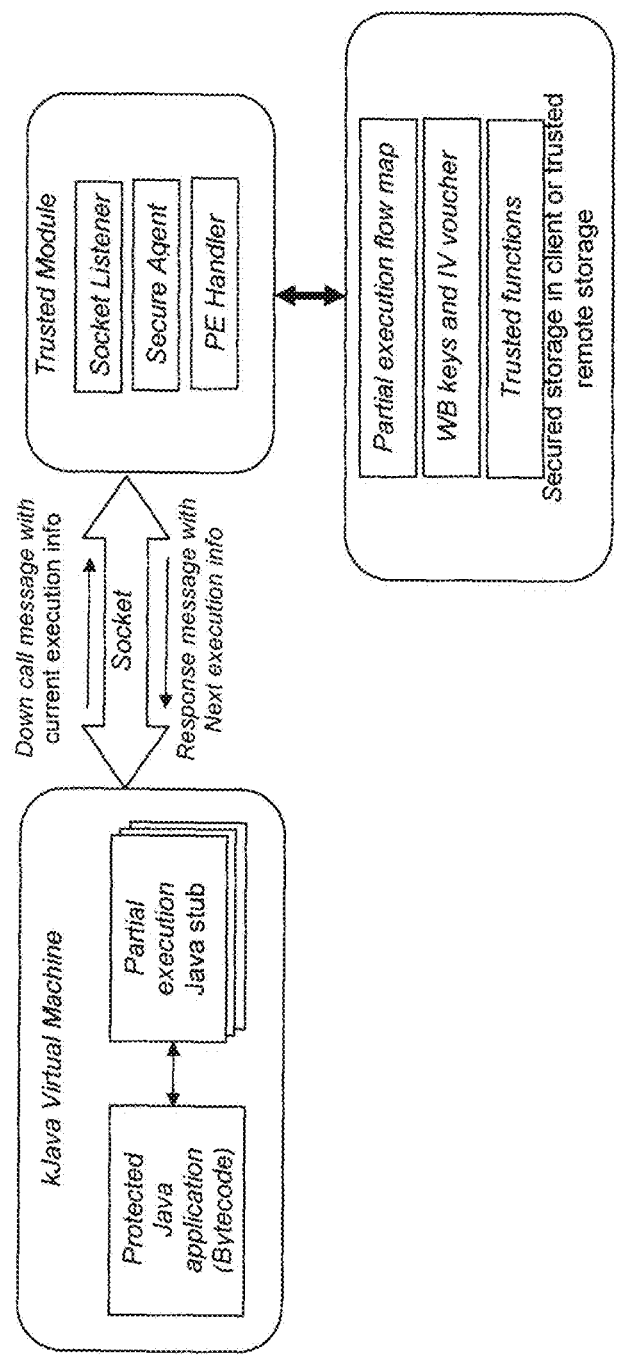
FIG. 6 shows an exemplary modular representation and functional diagram of a KJava application solution architecture in accordance with the present invention.

FIG. 6 shows an exemplary modular representation and functional diagram of a KJava application solution architecture.

Figure 7:
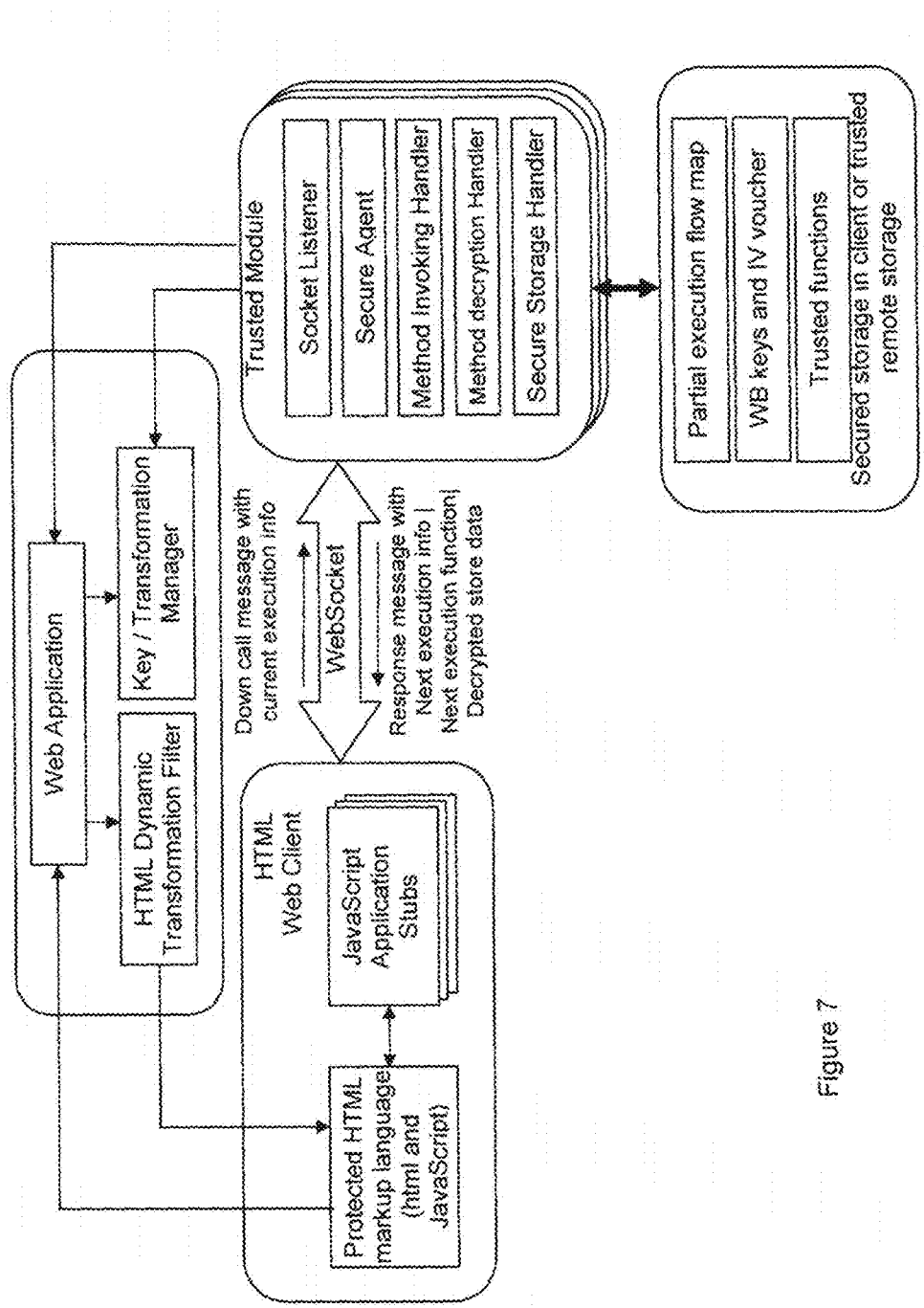
FIG. 7 shows an exemplary modular representation and functional diagram of a HTML5 web application protection architecture in accordance with the present invention.

FIG. 7 shows an exemplary modular representation and functional diagram of a HTML5 web application protection architecture. The techniques presented above with reference to a HTML5 web application is reused. With Websockets, the general architecture of partial execution protection can be more flexible in terms of deployment strategy of trusted modules and partial execution information.

Here are some exemplary differences between HTML5 web application protection architecture via partial execution and KJava application solution architecture via partial execution:

With HTML5, the page can be changed dynamically during execution, so function code can be stored in the trust module and retrieved/decrypted at page execution time, and can also be removed from the page.

Initially when web app is loaded (assumption that it is from some remote server), a filter is introduced, which applies dynamic transforms to the page before it reaches the client browser. For example this would have to parse and transform the http response.

The filter introduce would require the page response, implement transform techniques such as adding partial execution stubs, encrypting functions and replacing standard storage APIs with a specific secure store API (over websocket). Partial execution stubs could be requested by the trust module or pre-provisioned.

Because the websocket can make connections between two local application components or between local and remote application components, multiple trusted modules can be introduced.

When the web client is online, this also allows the trust module to communicate with the web application to managed transforms, retrieve page code, shared keys, authentication, etc.

There are some identified exemplary security advantages to using the optional HTML5 web applications are obvious:

Protected HTML page only contains partial execution information. Without knowledge of the dynamically removed partial execution info within Trusted Module, the entire application cannot function.

A web application, or different web applications can connect to one or different trusted modules locally or/and remotely. Different trusted modules can offer overlap or different security features to make attacks difficult. Also, necessary redundancy introduced by multiple trusted modules locally or remotely or both can make renewability and protection effective or flexible.

This secured execution interlocking extends application execution with Trusted Module during the execution. It provides opportunity for various additional protection features.

Among other exemplary use cases, the present invention is expected to be useful to secure applications implemented using scripted languages, interpreted languages and virtual machines. The trusted module can be either a software module or a hardware module. Adoption of virtual machines (e.g., BD+VM) in SetTop Boxes (STB) is also considered in order to improve updating of the CA client in the STB. In addition to processing, the smart card could also implement the dynamic control flow functions as described in this invention. The present invention may also enable deployment of a trusted module solution to much wider non-native execution environments with a better protection to secure the execution of a non-native application.

Figure 8:
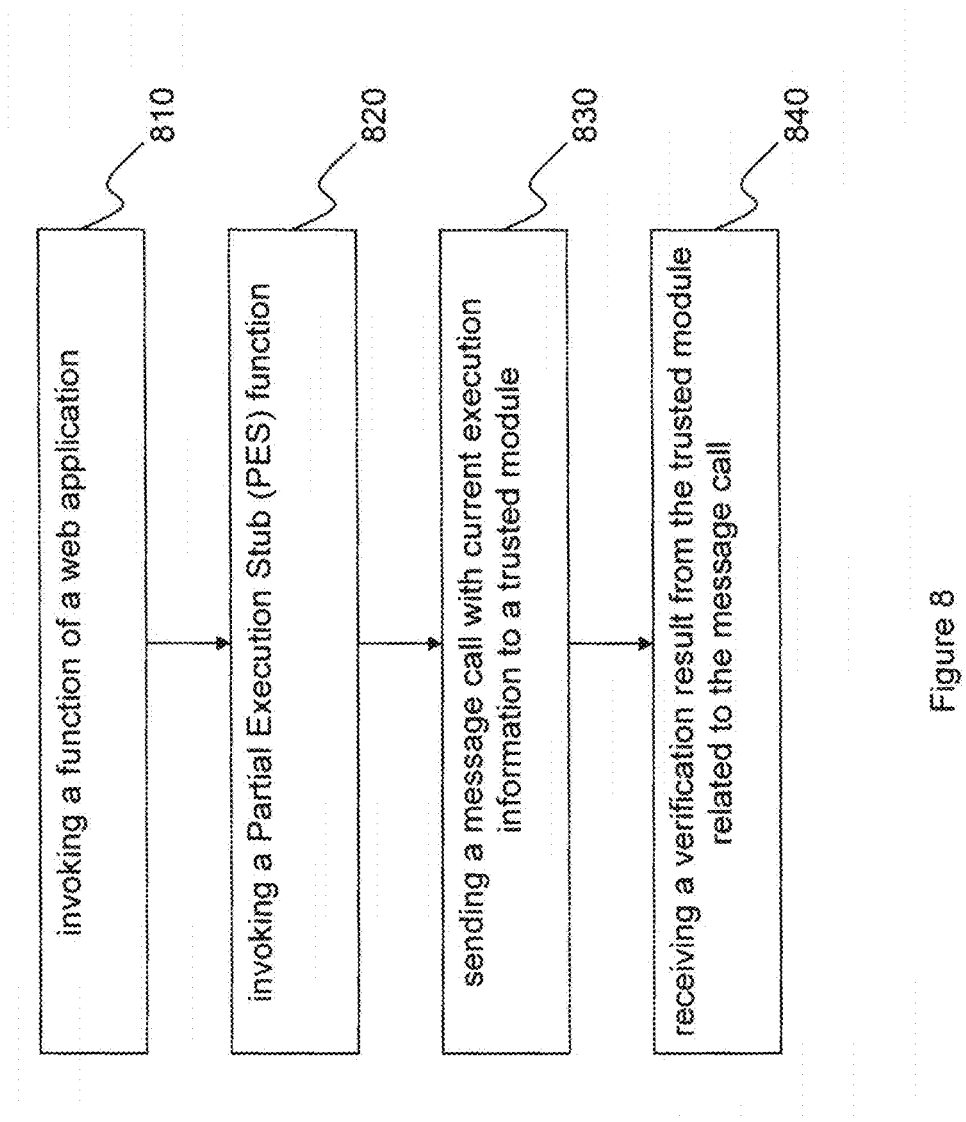
FIG. 8 is an exemplary flow chart of secured execution of a web application in accordance with the teachings of the present invention.

FIG. 8 shows an exemplary flow chart of secured execution of a web application in accordance with the teachings of the present invention. On a processor of a client device, a function of the web application is invoked 810. A Partial Execution Stub (PES) function is invoked during execution of the function of the web application 820. The PES function may optionally establish a communication (e.g., socket) connection with a trusted module (not shown). A message call with current execution information related to the web application is then sent from the PES function 830. The message call is sent to the trusted module. The message call may be sent over the communication connection. A verification result is thereafter received by the PES function from the trusted module related to the message call 840. The message call may be sent and the verification message over the communication connection. The communication connection may be a local or remote socket connection or a websocket connection for handling local or remote connections.

The trusted module may be executed on a server node or locally in the client device.

The verification result may indicate tampering of the web application, in which case the PES function may invoke a mitigation function (not shown). The mitigation action can vary and may involve, e.g., returning incorrect next function information, returning an invalid function definition, or returning a standard error function or result, causing the application behavior to fail immediately, gradually or execute incorrectly.

The verification result may alternatively comprise a next function information to be invoked for the web application. It may further comprise none or some parameter(s) required by the next function. In this latter case, the method follows with invoking the next function (not shown).

A second message call (not shown) may be sent to a second trusted module from the PES function with further current execution information related to the web application. For instance, the second trusted module may provide at least one function not offered by the trusted module. The PES function may thereafter receive a second verification result (not shown) from the second trusted module related to the second message call. The PES function may also alternatively forward the message call (not shown) with current execution information related to the web application to the second trusted module in response to the verification result. For instance, the second trusted module may provide at least one function offered by the trusted module and the verification result may indicate that the required processing was not performed by the first trusted module, indicate that a timeout was received as the verification result from the trusted module, etc. The PES function may thereafter receive a second verification result (not shown) from the second trusted module related to the forwarded message call.

Figure 9:
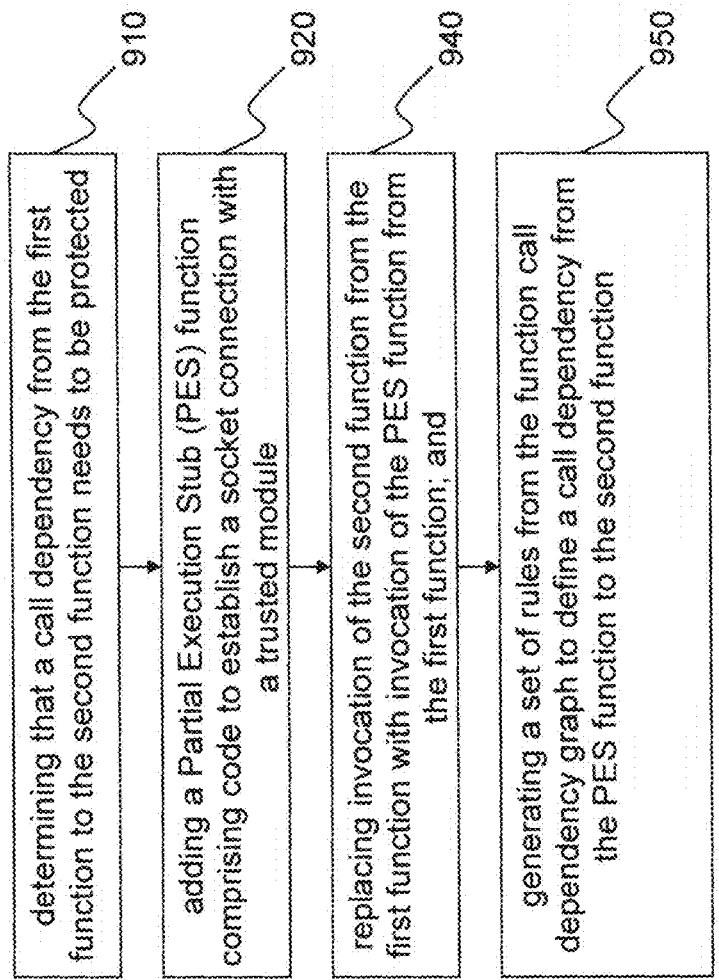
FIG. 9 is an exemplary flow chart of converting a web application to a secured web application in accordance with the teachings of the present invention.

FIG. 9 shows an exemplary flow chart of converting a web application to a secured web application. The secured web application may be obtained by applying static and/or dynamic processing techniques. The determination of what combination of processing techniques depends on implementation choice being the web application. At a network node, code of the web application is read from a memory unit (not shown). The code comprises multiple functions. The function call graph comprises at least a call dependency from a first function to a second function of the multiple functions. It is then determined that the call dependency from the first function to the second function needs to be protected (910). The web application is thus modified into the secured web application code by adding to the code of the web application, a partial execution stub (PES) function comprising code to establish a communication (e.g., socket) connection with a trusted module (920). The PES function requires interaction with the trusted module in order to perform the action previously taken by the second function. The web application is further modified into the secured web application code by modifying code of the web application by replacing invocation of the second function from the first function with invocation of the PES function from the first function (940) and generating a set of rules to define a call dependency from the PES function to the second function (950). The secured web application and the set of rules are stored into the memory unit. Once the secured web application is obtained, it may be delivered to one or more client device.

Optionally, generating the set of rules may be performed by generating a symbolic Partial Execution Flow Map (PEFM) and storing the set of rules into the memory unit is performed by storing the symbolic PEFM into the memory unit (not shown). Generating the set of rules may further comprise taking security requirements related to security actions and mitigating actions into consideration (not shown).

As another option, the first function and the second function may be present in the code of the web application as a single function. It may be necessary to split the single function into the first and second functions (not shown) based on an asset being processed in the single function (e.g., the single function may be read from the memory unit, split and stored to the memory unit as the first and second functions, which happens prior to reading the first and second functions therefrom).

The symbolic PEFM may comprise a record comprising a current caller element identifying the first function as a current calling function requiring an inquiry before invoking the second function, a current PES element identifying the PES function as invoking the trusted module to trigger the inquiry, a next function element identifying the second function and providing information necessary for invocation of the second function, a trusted functions element identifying a set of functions that are linked with the trusted module and can be executed by an invoking mechanism within the trusted module and a security actions element identifying a set of security features that the trusted module is capable of executing prior to returning a result of the inquiry.

Optionally, it is also possible to sign the secured web application prior to storing and encrypting the set of rules (or symbolic PEFM) prior to storing.

Figure 10:
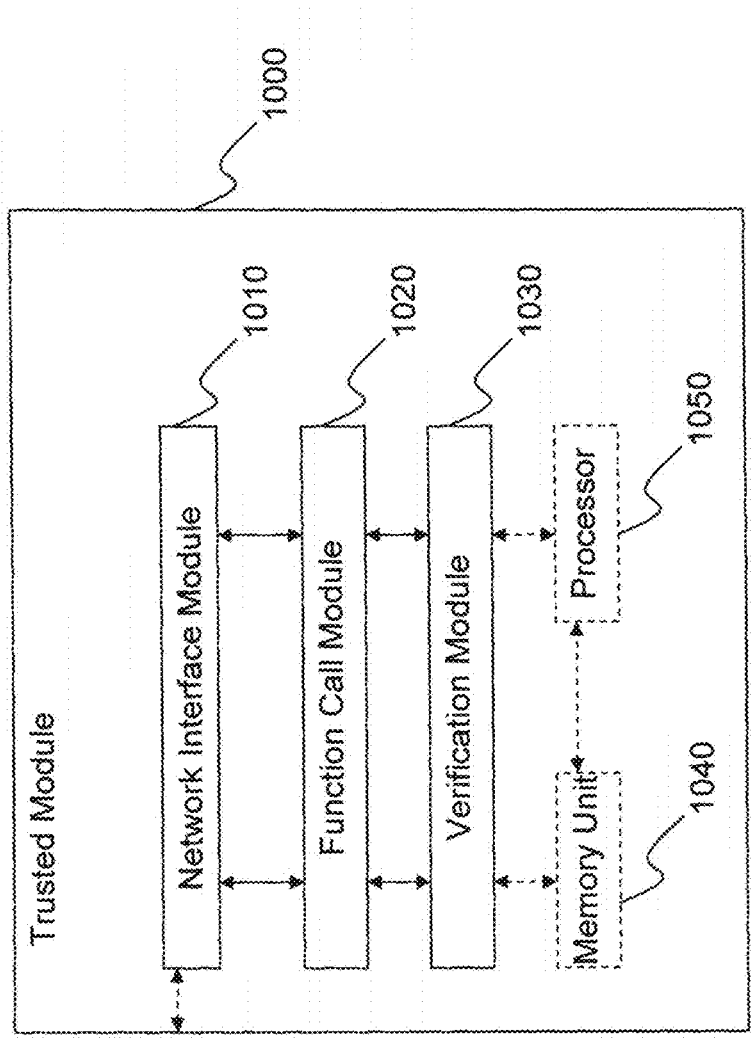
FIG. 10 is a modular representation of an exemplary a trusted module 1000 in accordance with the teachings of the present invention.

FIG. 10 shows a trusted module 1000 for securing execution of a web application executing on a client device. The trusted module comprises a network interface module 1010, a function call module 1020 and a verification module 1030. The trusted module may also comprise a security module (not shown).

The network interface module 1010 is for receiving a communication (e.g., socket) connection request from a Partial Execution Stub (PES) function of the web application. The function call module 1020 is for receiving a message call from the PES function via the communication connection. The message call comprises current execution information related to the web application. The verification module 1030 is for determining, based on the current execution information, a next function to be executed for the web application and sending a result of the determination to the PES function via the communication connection.

The trusted module 1000 may be executed on a server node (not shown) remote from the client device executing the web application or on the client device (not shown). The security module (not shown) may comprise secured functions and pre-defined mitigating actions.

Optionally, the result of the determination may indicate tampering of the web application. Alternatively, the result of the determination may comprise a next function information to be invoked for the web application and may further comprise none or some parameter(s) required by the next function.

Figure 11:
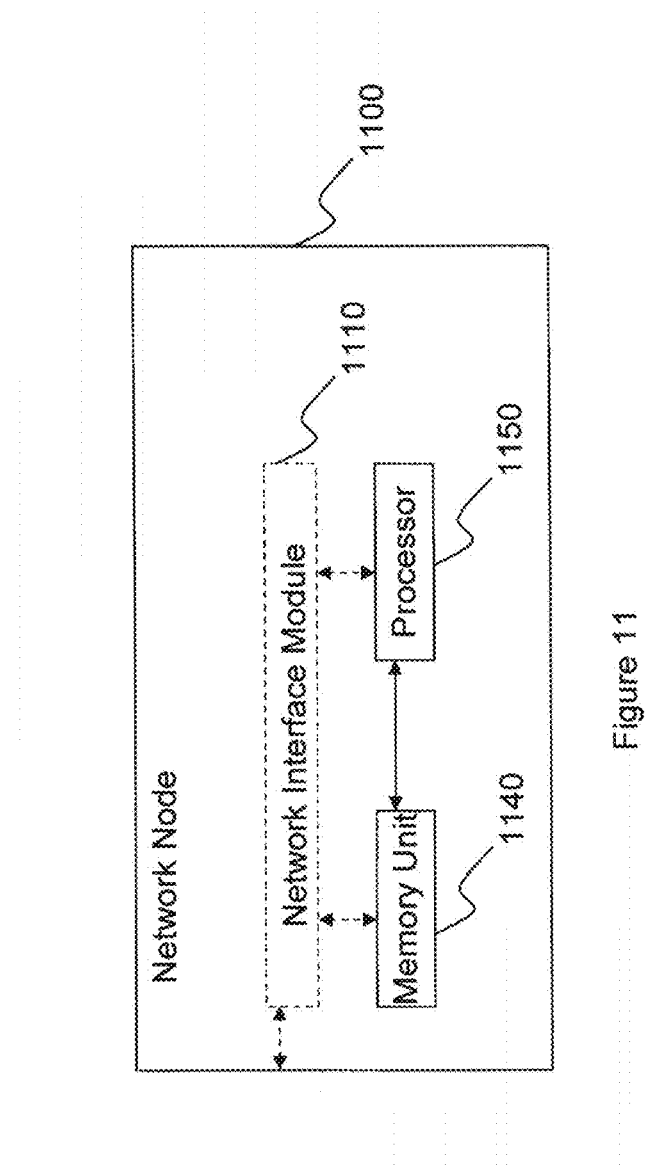
FIG. 11 is a modular representation of an exemplary a network node in accordance with the teachings of the present invention.

FIG. 11 shows a network node 1100 for converting a web application to a secured web application. The network node 1100 comprises a memory unit 1140 and a processor 1150 for securing the web application.

The memory unit 1140 is for storing code of the web application, which comprises multiple functions.

The processor 1150 is for securing the web application by determining, from a function call graph of the web application, that at least a call dependency from a first function to a second function of the web application needs to be protected. The processor 1150 is also for modifying the web application into the secured web application code. Modifying the web application into the secured web application code is performed by adding to the code of the web application, a partial execution stub (PES) function comprising code to establish a communication (e.g., socket) connection with a trusted module (not shown). The PES function requires interaction with the trusted module in order to perform the action originally taken by the second function. Modifying the web application into the secured web application code is further performed by modifying code of the web application by replacing invocation of the second function from the first function with invocation of the PES function from the first function and generating a set of rules to define a call dependency from the PES function to the second function. The processor 1150 is further for securing the web application by storing the secured web application and the set of rules into the memory unit 1140.

Optionally, generating the set of rules may be performed by generating a symbolic Partial Execution Flow Map (PEFM) and storing the set of rules into the memory unit 1140 may be performed by storing the symbolic PEFM into the memory unit. Generating the set of rules may further comprise taking security requirements related to security actions and mitigating actions into consideration (not shown).

As another option, the first function and the second function may be present in the code of the web application as a single function. The processor 1150 may then further split the single function into the first and second functions based on an asset being processed in the single function.

The processor 1150 may further sign the secured web application prior to storing and encrypt the set of rules (or symbolic PEFM) prior to storing.

The processor 1150 may represent a single processor with one or more processor cores or an array of processors, each comprising one or more processor cores. The memory unit 1140 may comprise various types of memory (different standardized or kinds of Random Access Memory (RAM) modules, memory cards, Read-Only Memory (ROM) modules, programmable ROM, etc.). Storage devices module (not shown) may be further be present as one or more logical or physical as well as local or remote hard disk drive (HDD) (or an array thereof). The storage devices module may further represent a local or remote database made accessible to the network node 1100 by a standardized or proprietary interface. The optional network interface module 1110 represents at least one physical interface that can be used to communicate with other network nodes. The optional network interface module 1110 may be made visible to the other modules of the network node 1100 through one or more logical interfaces. The actual stacks of protocols used by the physical network interface(s) and/or logical network interface(s) of the optional network interface module 1110 do not affect the teachings of the present invention. The variants of processor 1150, memory unit 1140, network interface module 1110 and storage devices module usable in the context of the present invention will be readily apparent to persons skilled in the art. Likewise, even though explicit mentions of the memory module 1140 and/or the processor 1150 are not made throughout the description of the present examples, persons skilled in the art will readily recognize that such modules are used in conjunction with other modules of the network node 1110 to perform routine as well as innovative steps related to the present invention.

Figure 12:
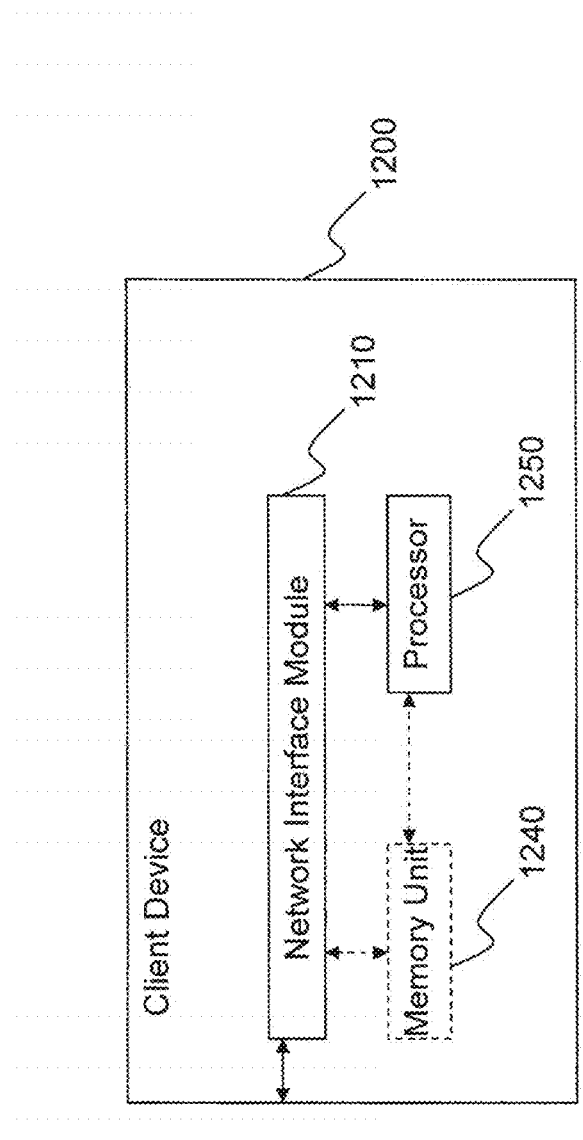
FIG. 12 is a modular representation of an exemplary client device in accordance with the teachings of the present invention.

FIG. 12 shows a client device 1200 comprising a network interface module 1210 and a processor 1250 executing a web application. The network interface module 1210 opens a communication (e.g., socket) connection between a Partial Execution Stub (PES) function and a trusted module (not shown). The communication connection may be a local or remote socket connection or a websocket. The processor 1250 executes the web application by invoking a function of a web application, invoking the PES function during execution of the function of the web application, sending a message call from the PES function with current execution information related to the web application to the trusted module via the communication connection and receiving a verification result from the trusted module related to the message call.

Optionally, the trusted module may be executed on a remote server node (not shown).

The verification result may indicate tampering of the web application, in which case the processor 1250 may further execute a mitigation action. Alternatively, the verification result may also comprise a next function information to be invoked for the web application and may, if applicable, comprise one ore more parameter required by the next function. The processor 1250 further invokes the next function.

The processor 1250 may represent a single processor with one or more processor cores or an array of processors, each comprising one or more processor cores. The optional memory unit 1240 may comprise various types of memory (different standardized or kinds of Random Access Memory (RAM) modules, memory cards, Read-Only Memory (ROM) modules, programmable ROM, etc.). Storage devices module (not shown) may be further be present as one or more logical or physical as well as local or remote hard disk drive (HDD) (or an array thereof). The storage devices module may further represent a local or remote database made accessible to the client device 1200 by a standardized or proprietary interface. The network interface module 1210 represents at least one physical interface that can be used to communicate with other network nodes. The network interface module 1210 may be made visible to the other modules of the client device 1200 through one or more logical interfaces. The actual stacks of protocols used by the physical network interface(s) and/or logical network interface(s) of the network interface module 1210 do not affect the teachings of the present invention. The variants of processor 1250, optional memory unit 1240, network interface module 1210 and storage devices module usable in the context of the present invention will be readily apparent to persons skilled in the art. Likewise, even though explicit mentions of the optional memory module 1240 and/or the processor 1250 are not made throughout the description of the present examples, persons skilled in the art will readily recognize that such modules are used in conjunction with other modules of the client device 1200 to perform routine as well as innovative steps related to the present invention.

In accordance with the present invention, in order to deploy one or more web applications, multiple different deployment models may be used. The chosen deployment model may be affected by, for instance, by security requirements and the functional nature of the web applications. The following four exemplary deployment models, among others, are provided.

A first deployment model could be to deploy a secured web application with PES functions, one or more trusted modules and the PEFM into a client environment. The PEFM may be stored into local secured storage accessible locally to the trusted module. This first example of deployment model can provide support for off-line secured web application execution.

A second deployment model could be to deploy the secured web application with PES functions and one r more trusted modules into a client environment and the PEFM into a remote secured storage that can be accessed by the trusted module via remote connection and access facility.

A third deployment model could be to deploy the secured web application with PES functions into a client environment, and one or more trusted modules and the PEFM into one or more remote network nodes. The secured storage that can be accessed by PES functions via remote connection and access facility.

A fourth deployment model could be to combine the first three models to deploy the secured web application with PES functions into a client environment different sets of characteristics. For instance, in the client environment, there could be one or more trusted modules and some PEFM stored in local secured storage while one or more trusted modules are stored in remote servers or cloud environments, and some PEFM is stored in remote secured storage. In such an example, dynamic execution dependency can be coordinated by correlating different trusted modules locally and remotely. Execution of protected function may occur on-line or off-line, or a mix of both, which likely renders attacks even more difficult.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method executed by one or more computing devices for securing execution of a web application in a non-native execution environment, the method comprising:
   executing, by at least one of the one or more computing devices, a function of the web application in the non-native execution environment, wherein the web application comprises only a portion of a plurality of execution dependencies required for execution of the web application and wherein the web application comprises one or more partial execution stub (PES) functions configured to bridge one or more missing execution dependencies in the plurality of execution dependencies;
   detecting, by at least one of the one or more computing devices, invocation of a PES function in the one or more PES functions during execution of the function of the web application, wherein the PES function corresponds to a missing execution dependency in the one or more missing execution dependencies;
   generating, by at least one of the one or more computing devices, a message comprising current execution information of the web application, the current execution information including an identifier of the PES function and an identifier of the function of the web application;
   transmitting, by at least one of the one or more computing devices, the message to a trusted module external to the non-native execution environment via a communication connection between the PES function and the trusted module, wherein the trusted module is configured to perform a search for the missing execution dependency based at least in part on the identifier of the PES function and the identifier of the function of the web application; and
   receiving, by at least one of the one or more computing devices, a result of the search from the trusted module via the communication connection between the PES function and the trusted module, wherein the result comprises an execution dependency corresponding to the missing execution dependency when the search is successful.

2. The method of claim 1, further comprising:
   determining, by at least one of the one or more computing devices, whether the received result includes the execution dependency corresponding to the missing execution dependency, wherein the execution dependency corresponding to the missing execution dependency specifies a second function of the web application; and
   invoking, by at least one of the one or more computing devices, the second function based at least in part on a determination that the received result includes the execution dependency corresponding to the missing execution dependency, wherein the second function is invoked by the PES function.

3. The method of claim 2, wherein the invocation of the PES function includes one or more parameters and wherein invoking the second function based at least in part on a determination that the received result includes the execution dependency corresponding to the missing execution dependency further comprises:
   passing the one or more parameters into the second function.

4. The method of claim 1, wherein the trusted module is executed on a native side computing device external to the one or more computing devices.

5. The method of claim 1, further comprising:
   transmitting, by at least one of the one or more computing devices, a second message including additional current execution information of to the web application to a second trusted module external to the non-native execution environment via a communication connection between the PES function and the second trusted module, wherein the second trusted module is configured to perform a verification of the additional current execution information; and
   receiving, by at least one of the one or more computing devices, result of the verification from the second trusted module via the communication connection between the PES function and the second trusted module.

6. The method of claim 1, further comprising:
   transmitting, by at least one of the one or more computing devices, the message comprising current execution information of the web application to a second trusted module external to the non-native execution environment via a communication connection between the PES function and the second trusted module based at least in part on a determination that the result of the search from the trusted module indicates that the search was not performed by the first verification module, wherein the second trusted module is configured to perform a search for the missing execution dependency based at least in part on the current execution information; and
   receiving, by at least one of the one or more computing devices, a result of the search from the second trusted module via the communication connection between the PES function and the second trusted module.

7. The method of claim 1, wherein the trusted module is further configured to perform one or more of: an integrity check of the current execution information, a cryptographic operation, or an anti-debug operation.

8. The method of claim 1, wherein the trusted module is further configured to invoke a mitigation function when the search for the missing execution dependency is unsuccessful.

9. The method of claim 1, wherein the non-native execution environment comprises a java virtual machine and wherein the trusted module is external to the java virtual machine.

10. An apparatus for securing execution of a web application in a non-native execution environment, the apparatus comprising:
one or more processors; and
one or more memories operatively coupled to at least one of the one or more processors and having instructions stored thereon that, when executed by at least one of the one or more processors, cause at least one of the one or more processors to:
execute a function of the web application in the non-native execution environment, wherein the web application comprises only a portion of a plurality of execution dependencies required for execution of the web application and wherein the web application comprises one or more partial execution stub (PES) functions configured to bridge one or more missing execution dependencies in the plurality of execution dependencies;
detect invocation of a PES function in the one or more PES functions during execution of the function of the web application, wherein the PES function corresponds to a missing execution dependency in the one or more missing execution dependencies;
generate a message comprising current execution information of the web application, the current execution information including an identifier of the PES function and an identifier of the function of the web application;
transmit the message to a trusted module external to the non-native execution environment via a communication connection between the PES function and the trusted module, wherein the trusted module is configured to perform a search for the missing execution dependency based at least in part on the identifier of the PES function and the identifier of the function of the web application; and
receive a result of the search from the trusted module via the communication connection between the PES function and the trusted module, wherein the result comprises an execution dependency corresponding to the missing execution dependency when the search is successful.

11. The apparatus of claim 10, wherein at least one of the one or more memories has further instructions stored thereon that, when executed by at least one of the one or more processors, cause at least one of the one or more processors to:
determine whether the received result includes the execution dependency corresponding to the missing execution dependency, wherein the missing execution dependency specifies a second function of the web application; and
invoke the second function based at least in part on a determination that the received result includes the execution dependency corresponding to the missing execution dependency, wherein the second function is invoked by the PES function.

12. The apparatus of claim 11, wherein the invocation of the PES function includes one or more parameters and wherein the instructions that, when executed by at least one of the one or more processors, cause at least one of the one or more processors to invoke the second function based at least in part on a determination that the received result includes the execution dependency corresponding to the missing execution dependency further cause at least one of the one or more processors to:
pass the one or more parameters into the second function.

13. The apparatus of claim 10, wherein the trusted module is executed on a native side computing device external to the apparatus.

14. The apparatus of claim 10, wherein at least one of the one or more memories has further instructions stored thereon that, when executed by at least one of the one or more processors, cause at least one of the one or more processors to:
transmit a second message including additional current execution information of the web application to a second trusted module external to the non-native execution environment via a communication connection between the PES function and the second trusted module, wherein the second trusted module is configured to perform a verification of the additional current execution information; and
receive a result of the verification from the second trusted module via the communication connection between the PES function and the second trusted module.

15. The apparatus of claim 10, wherein at least one of the one or more memories has further instructions stored thereon that, when executed by at least one of the one or more processors, cause at least one of the one or more processors to:
transmit the message comprising current execution information of the web application to a second trusted module external to the non-native execution environment via a communication connection between the PES function and the second trusted module based at least in part on a determination that the result of the search from the trusted module indicates that the search was not performed by the first verification module, wherein the second trusted module is configured to perform a search for the missing execution dependency based at least in part on the current execution information; and
receive a result of the search from the second trusted module via the communication connection between the PES function and the second trusted module.

16. The apparatus of claim 10, wherein the trusted module is further configured to perform one or more of: an integrity check of the current execution information, a cryptographic operation, or an anti-debug operation.

17. The apparatus of claim 10, wherein the trusted module is further configured to invoke a mitigation function when the search for the missing execution dependency is unsuccessful.

18. The apparatus of claim 10, wherein the non-native execution environment comprises a java virtual machine and wherein the trusted module is external to the java virtual machine.

19. At least one non-transitory computer-readable medium storing computer-readable instructions that, when executed by one or more computing devices, cause at least one of the one or more computing devices to:
execute a function of the web application in the non-native execution environment, wherein the web application comprises only a portion of a plurality of execution dependencies required for execution of the web application and wherein the web application comprises one or more partial execution stub (PES) functions configured to bridge one or more missing execution dependencies in the plurality of execution dependencies;

detect invocation of a PES function in the one or more PES functions during execution of the function of the web application, wherein the PES function corresponds to a missing execution dependency in the one or more missing execution dependencies;

generate a message comprising current execution information of the web application, the current execution information including an identifier of the PES function and an identifier of the function of the web application;

transmit the message to a trusted module external to the non-native execution environment via a communication connection between the PES function and the trusted module, wherein the trusted module is configured to perform a search for the missing execution dependency based at least in part on the identifier of the PES function and the identifier of the function of the web application; and receive a result of the search from the trusted module via the communication connection between the PES function and the trusted module, wherein the result comprises an execution dependency corresponding to the missing execution dependency when the search is successful.

20. The at least one non-transitory computer-readable medium of claim 19, further storing computer-readable instructions that, when executed by at least one of the one or more computing devices, cause at least one of the one or more computing devices to:

determine whether the received result includes the execution dependency corresponding to the missing execution dependency, wherein the missing execution dependency specifies a second function of the web application; and invoke the second function based at least in part on a determination that the received result includes the execution dependency corresponding to the missing execution dependency, wherein the second function is invoked by the PES function.

21. The at least one non-transitory computer-readable medium of claim 20, wherein the invocation of the PES function includes one or more parameters and wherein the instructions that, when executed by at least one of the one or more computing devices, cause at least one of the one or more computing devices to invoke the second function based at least in part on a determination that the received result includes the execution dependency corresponding to the missing execution dependency communication further cause at least one of the one or more computing devices to:

pass the one or more parameters into the second function.

22. The at least one non-transitory computer-readable medium of claim 19, wherein the trusted module is executed on a native side computing device external to the one or more computing devices.

23. The at least one non-transitory computer-readable medium of claim 19, further storing computer-readable instructions that, when executed by at least one of the one or more computing devices, cause at least one of the one or more computing devices to:

transmit a second message including additional current execution information of the web application to a second trusted module external to the non-native execution environment via a communication connection between the PES function and the second trusted module, wherein the second trusted module is configured to perform a verification of the additional current execution information; and receive a result of the verification from the second trusted module via the communication connection between the PES function and the second trusted module.

24. The at least one non-transitory computer-readable medium of claim 19, further storing computer-readable instructions that, when executed by at least one of the one or more computing devices, cause at least one of the one or more computing devices to:

transmit the message comprising current execution information of the web application to a second trusted module external to the non-native execution environment via a communication connection between the PES function and the second trusted module based at least in part on a determination that the result of the search from the trusted module indicates that the search was not performed by the first verification module, wherein the second trusted module is configured to perform a search for the missing execution dependency based at least in part on the current execution information; and receive a result of the search from the second trusted module via the communication connection between the PES function and the second trusted module.

25. The at least one non-transitory computer-readable medium of claim 19, wherein the trusted module is further configured to perform one or more of: an integrity check of the current execution information, a cryptographic operation, or an anti-debug operation.

26. The at least one non-transitory computer-readable medium of claim 19, wherein the trusted module is further configured to invoke a mitigation function when the search for the missing execution dependency is unsuccessful.

27. The at least one non-transitory computer-readable medium of claim 19, wherein the non-native execution environment comprises a java virtual machine and wherein the trusted module is external to the java virtual machine.

* * * * *